United States Patent [19]

Monaghan et al.

[11] 4,208,092
[45] Jun. 17, 1980

[54] FIBER OPTIC MULTI-CABLE PAIR CONNECTOR

[75] Inventors: Kevin J. Monaghan, Middlebury; Russell C. Schwickert, Newtown; John A. Makuch, Danbury, all of Conn.

[73] Assignee: Bunker Ramo Corporation, Oak Brook, Ill.

[21] Appl. No.: 842,187

[22] Filed: Oct. 14, 1977

[51] Int. Cl.² ............................................. G02B 5/14
[52] U.S. Cl. ............................................... 350/96.21
[58] Field of Search ............... 350/96.20, 96.21, 96.22; 339/91 R-91 P, 94 R-94 M, 253 R-253 S, 258 R, 258 A

[56] References Cited

U.S. PATENT DOCUMENTS

| | | | |
|---|---|---|---|
| 2,419,018 | 4/1947 | Gudie | 339/136 M |
| 2,999,221 | 9/1961 | Ellis et al. | 339/176 M |
| 3,040,287 | 6/1962 | Agron et al. | 339/94 M |
| 3,110,093 | 11/1963 | Johnson | 29/747 |
| 3,160,457 | 12/1964 | Fischer | 339/91 |
| 3,170,752 | 2/1965 | Van Horssen | 339/217 |
| 3,229,244 | 1/1966 | Bachman | 339/217 |
| 3,500,297 | 3/1970 | Bac | 339/217 |
| 3,560,910 | 2/1971 | Sosinski | 339/217 |
| 3,597,726 | 8/1971 | Appleton et al. | 339/195 P |
| 3,637,284 | 1/1972 | Plyler | 350/96.20 |
| 3,671,922 | 6/1972 | Zerlin et al. | 339/74 R |
| 3,697,935 | 10/1972 | Drapkin | 339/217 S |
| 3,721,943 | 3/1973 | Curr | 339/94 M |
| 3,763,460 | 10/1973 | Hatschek et al. | 339/89 M |
| 3,790,791 | 2/1974 | Anderson | 250/227 |
| 3,792,418 | 2/1974 | Kailus | 339/177 R |
| 3,806,225 | 4/1974 | Codrino | 350/96.20 |
| 3,880,452 | 4/1975 | Fields | 285/177 |
| 3,897,134 | 7/1975 | Scrivo et al. | 350/96.22 |
| 3,904,269 | 9/1975 | Lebduska et al. | 350/96.22 |
| 3,914,880 | 10/1975 | Dakss et al. | 350/96.21 |
| 3,922,064 | 11/1975 | Clark et al. | 350/96.22 |
| 3,923,371 | 12/1975 | Dalgleish | 350/96.21 |
| 3,936,145 | 2/1976 | McCartney | 350/96.22 |
| 3,947,182 | 3/1976 | McCartney | 350/96.22 |
| 3,948,582 | 4/1976 | Martin | 350/96.21 |
| 3,951,514 | 4/1976 | Medina, Jr. | 350/96.22 |
| 3,951,515 | 4/1976 | Allard | 350/96.22 |
| 3,963,320 | 6/1976 | Spinner | 339/177 R |
| 3,963,323 | 6/1976 | Arnold | 350/96.22 |
| 3,963,327 | 6/1976 | Poirier | 350/287 |
| 3,982,815 | 9/1976 | Nakayama | 350/96.22 |
| 3,984,174 | 10/1976 | Landgreen | 350/96.22 |
| 3,989,885 | 11/1976 | Penczynski et al. | 174/155 |
| 3,990,779 | 11/1976 | McCartney | 350/96.21 |
| 3,999,837 | 12/1976 | Bowen et al. | 350/96.22 |
| 4,008,948 | 2/1977 | Dalgleish et al. | 350/96.21 |
| 4,009,931 | 3/1977 | Malsby et al. | 350/96.22 |
| 4,015,894 | 4/1977 | Rocton | 350/96.21 |
| 4,017,139 | 4/1977 | Nelson | 339/91 R |
| 4,021,098 | 5/1977 | McCartney et al. | 350/96.24 |
| 4,026,633 | 5/1977 | Crick | 350/96.21 |
| 4,027,938 | 6/1977 | Lewis | 350/96.22 |
| 4,043,026 | 8/1977 | Weidhaas et al. | 29/592 R |
| 4,047,797 | 9/1977 | Arnold et al. | 350/96.21 |

FOREIGN PATENT DOCUMENTS

| | | |
|---|---|---|
| 2529352 | 1/1976 | Fed. Rep. of Germany ........ 350/96.21 |
| 2505046 | 8/1976 | Fed. Rep. of Germany ........ 350/96.22 |
| 2291510 | 6/1976 | France . |
| 2296862 | 7/1976 | France . |
| 1450019 | 9/1976 | United Kingdom . |
| 1458169 | 12/1976 | United Kingdom . |
| 1459380 | 12/1976 | United Kingdom . |
| 1471790 | 4/1977 | United Kingdom . |
| 1492319 | 11/1977 | United Kingdom . |
| 1510017 | 5/1978 | United Kingdom . |
| 1511988 | 5/1978 | United Kingdom . |

*Primary Examiner*—John K. Corbin
*Assistant Examiner*—John D. Lee
*Attorney, Agent, or Firm*—F. M. Arbuckle; P. D. Ertel

[57] ABSTRACT

A fiber optic connector assembly of the type which optically couples one or more pairs of fiber optic cables together by aligning and closely spacing the terminal ends of each cable pair includes a connector having a cable terminating tubular pin which receives one of the cables and which also has an outer circumferential flange. The pin is received within a channel of the connector body which channel has a forwardly facing annular shoulder portion. A cylindrical retainer coaxially disposed about the pin has a rear surface engaging the channel shoulder and forwardly depending fingers engaging the pin flange. The rearward end of the retainer also includes an integral spring mechanism which urges the pin in the forward direction so that its forward end continuously engages a spacer within a mating connector which causes the terminal ends of the coupled cables to be closely and controllably spaced for efficient light transfer between the fiber optic cables.

The terminating pin also includes improved structure for receiving and gripping cable strength members and the mating connector includes an alignment sleeve which captivates the mating connector terminal pin and aligns the terminating pin pairs. The alignment sleeve also has an inner annular flange which forms a spacer for closely spacing the terminal ends of the cables.

41 Claims, 3 Drawing Figures

FIBER OPTIC MULTI-CABLE PAIR CONNECTOR

BACKGROUND OF THE INVENTION

The present invention is generally directed to a fiber optic cable connector assembly and more particularly to fiber optic cable connectors which, when mated, form an assembly which accurately aligns and spaces the terminal ends of one or more fiber optic pairs to couple the optical fibers of the cables together for efficient light transfer.

The virtues and advantages of fiber optics in today's technology are well known and therefore need not be alluded to herein. With the ever increasing use of fiber optics, the need for efficient and readily usable and serviceable fiber optic connector assemblies has arisen.

Fiber optic connector assemblies for optically coupling the terminal ends of fiber optic cable pairs together must properly align and closely space the terminal ends of the optical fiber pairs to achieve efficient, low loss, light transfer between the cables. Moreover, while the terminal ends are spaced closely apart, they must not be allowed to touch. Any touching of the fiber ends could result in scratching of the finely polished terminal end surfaces and consequent decrease in light transfer efficiency. Hence, the terminal ends of fiber optic cables must be aligned and spaced to very exact tolerances, and even more so, when the cables are of the single fiber variety.

Whenever it is required that connector components be fabricated to closely held tolerances, manufacturing costs rise making the connectors exorbitantly expensive. Such has been the case with prior art connectors.

As with any type of connector interconnection, field service may become necessary. When field service is required, it is advantageous, for obvious reasons, if the interconnection can be easily disassembled without destroying any of the connector component parts or damaging the component parts to the extent that they cannot be re-used. Fiber optic connectors have generally included terminating pins constructed from rigid material which receive the optic fibers and support them in the connector. When service is required, it is usually necessary to remove the terminal pins. Unfortunately, the fiber optic connectors which have come heretofore have included mechanisms for accurately positioning the terminating pins within the connectors which impede the extraction of the terminating pins. Hence, in many cases, damage to the pins or other connector components result during servicing.

It is therefore a general object of the present invention to provide improved connectors for a fiber optic connector assembly.

It is a more specific object of the present invention to provide a fiber optic connector which includes improved optical fiber terminal end alignment and spacing means to achieve efficient light transfer.

SUMMARY OF THE INVENTION

The invention provides a fiber optic connector for use in a fiber optic connector assembly of the type which includes alignment means and stop means for aligning and closely spacing the forward ends of the optical fibers of at least one pair of fiber optic cables to thereby optically couple the fiber optic cables together for efficient light transfer. The connector comprises a rigid terminating member having a longitudinal bore dimensioned for receiving the forward end of one of the cables and having an outer engageable portion, a channel having an inner surface dimensioned for receiving the rigid member and having an inter-engageable portion, and retainer means disposed between the channel inner surface and the rigid member. The retainer means includes a forward end portion communicating with the rigid member outer engageable portion and a rear portion communicating with the channel inner surface engageable portion. The rear portion of the retainer means includes integral spring means for urging the rigid member in the forward axial direction against the connector assembly stop means to cause the forward end of the rigid member to be in continuous engagement with the stop means.

The present invention also provides a fiber optic connector for use in a fiber optic connector assembly which aligns and closely spaces the forward ends of the optical fibers of at least one pair of fiber optic cables to thereby optically couple the fiber optic cables together for efficient light transfer. The connector includes a rigid body having a channel therethrough, an alignment sleeve within the channel having an inner abutment means intermediate the ends of the sleeve and an interlocking protrusion at the rear end of the sleeve and a rigid terminating member within the sleeve having a longitudinal bore dimensioned for receiving the forward end of one of the cables and having an outer surface indentation communicating with the alignment sleeve locking protrusion for locking the sleeve and the terminating member together. The terminating member also includes a front end abutting the sleeve abutment means for accurately and closely spacing the forward end of the optical fiber of the fiber optic cable within the longitudinal bore with the forward end of an optical fiber carried within the terminating member of a mating connector which also abuts the abutment means.

BRIEF DESCRIPTION OF THE DRAWINGS

The features of the present invention which are believed to be novel are set forth with particularly in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
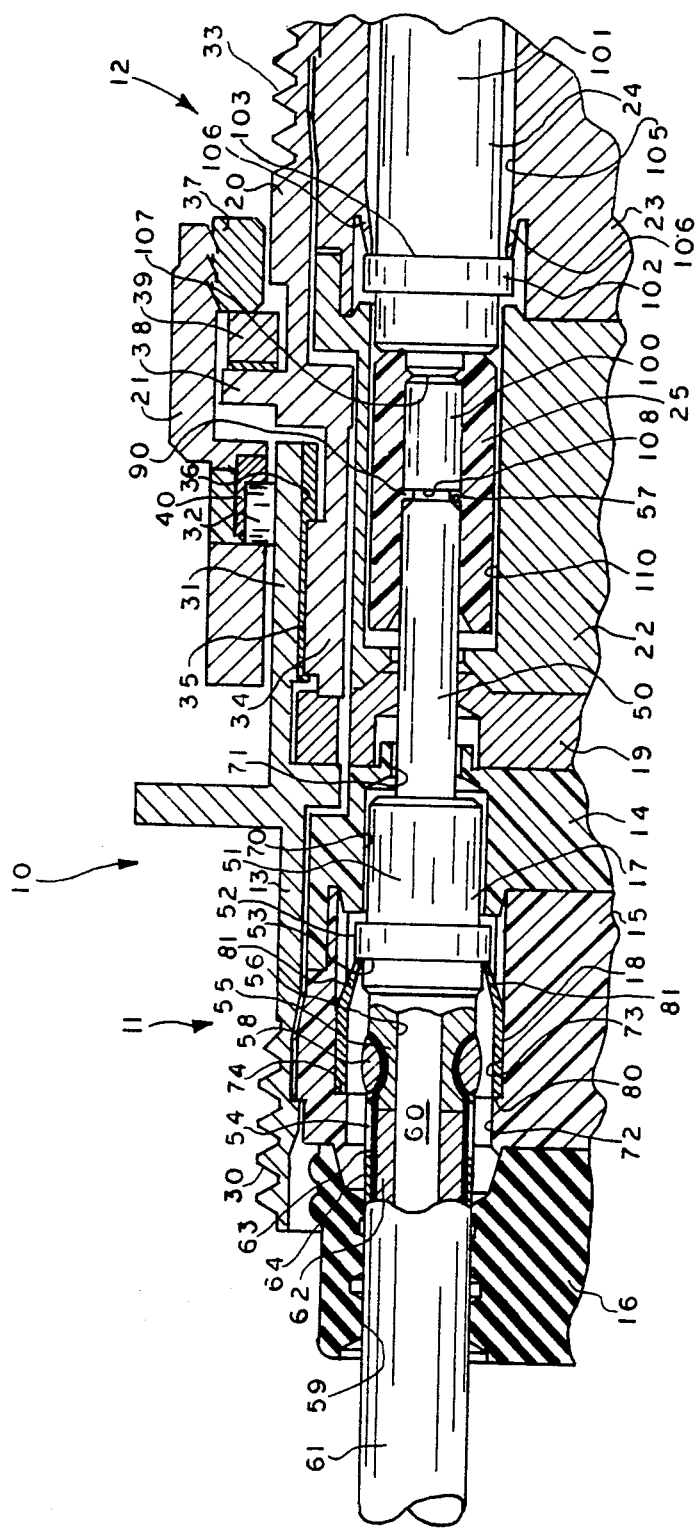
FIG. 1 is a partial cross-sectional view with portions cut away showing a fiber optic connector assembly incorporating fiber optic connectors embodying the present invention to an enlarged scale.

Referring now to FIG. 1, it shows a partial cross-section of a connector assembly embodying the present invention and more particularly shows in cross-section the structure associated with optically coupling one pair of fiber optic cables. In actual practice, the connector assembly may include additional structure for optically coupling a plurality of fiber optic cable pairs.

The connector assembly 10 of FIG. 1 includes a plug connector 11 and a receptacle connector 12. The plug connector 11 comprises a generally cylindrical outer shell 13, a rigid body comprising a forward section 14 and a rear section 15, a rear grommet 16, and a face seal 19. The plug connector 11 also includes a fiber optic cable terminating pin assembly 17 and a retainer 18 for the terminating pin assembly 17.

The receptacle connector 12 includes an outer cylindrical shell 20, a bayonet ring 21, and a rigid body comprising a forward section 22 and a rearward section 23. The receptacle connector 12 also includes a fiber optic cable terminating pin assembly 24 and an alignment sleeve 25.

Referring more particularly to the plug connector 11, the outer shell 13, which is formed from aluminum for example, includes at its rear end an external thread 30 to accommodate accessory mounting structure or coupling devices (not shown). The outer shell 13 has a forward extension 31 which extends beyond the face seal 19 of the connector in the forward direction and carries a plurality of bayonet pins one of which is shown at 32.

In a similar manner, the receptacle connector 12 includes an external thread 33 at its rear end and a forward extension 34 which includes a plurality of alignment flanges 35 which are received within alignment slots 36 of the forward extension 31 of the outer plug connector shell 13. The bayonet ring 21 is retained on the outer periphery of shell 20 by retention ring 37 and an annular flange 38 of shell 20. Between retention ring 37 and annular flange 38 is a washer 39. As the plug and receptacle connectors mate and the bayonet ring 20 is rotated, its ramped surface 40 acts upon the bayonet pin 32 to cause the two connectors to be pulled together into full mating relation.

Referring again to the plug connector 11, the terminating pin assembly 17 comprises a rigid terminating member taking the form of a generally cylindrical pin having a forward extension 50 of minor diameter and a rear portion 51 of major diameter. Portion 51 includes a circumferential flange 52 forming a rearwardly facing shoulder portion 53 which may also be described as an outer engageable portion. The terminating pin assembly 17 also includes a plurality of axial slots 54 which terminate in forward curved portions 55. The entire terminating pin assembly 17 includes a longitudinal bore 56 which is dimensioned for receiving the one or more optical fibers 60 of fiber optic cable 61. Fiber optic cable 61 also includes an annular layer of protective material 62, a plurality of coaxial strength members 63, and an outer sheath 64.

The one or more optical fibers 60 extend through the longitudinal bore of the terminating pin assembly 17 in the forward direction and terminate at the terminal end face of the pin assembly at 57.

In terminating the fiber optic cable 61 with the terminating pin assembly 17, the annular protective layer 62 is removed so that the one or more optical fibers 60 extend through the longitudinal bore 56 of the terminating pin and beyond the terminal end face 57 of the pin. Thereafter a suitable adhesive such as epoxy may be introduced into the forward end of the pin to secure the optical fibers at the pin forward end. Thereafter, the optical fibers are ground and polished to a smooth surface within the plane of the terminal end 57. Also, the strength members 63 are received within the axial slot 54 and layed within the forward curved portions 55 of the slots. Thereafter, the strength members 63 are epoxied in the curved portions and a ring-shaped retaining member such as a split ring ferrule 58 is crimped over the strength members in the curved portions 55 to securely terminate the fiber optic cable 61 within the pin assembly.

The grommet 16 includes an aperture 59 for each fiber optic cable 61 and provides a tight moisture seal therewith.

The rigid body portion 14 includes a first bore 70 dimensioned to accommodate the major diameter section 51 of the terminating pin and a second bore 71 which is dimensioned to allow the forward extension 50 of the pin to extend therethrough. The rigid body portion 15 includes a first bore 72 and a counterbore 73 forming a forwardly facing shoulder 74 which may be described as an inner engageable portion. Also, the bores 71, 70, 72, and 73 communicate with one another to form a channel for receiving in floating relationship the terminating pin assembly 17.

Figure 2:
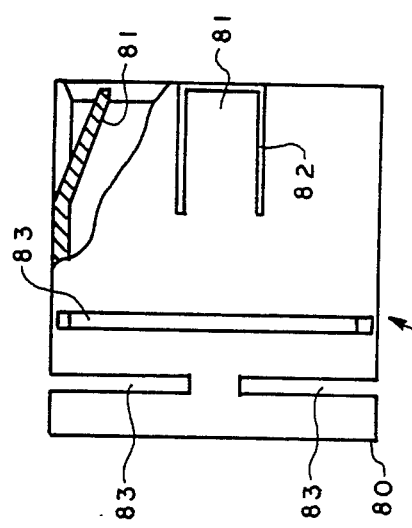
FIG. 2 is a side plan view with a portion broken away of a principal component of the fiber optic connector of the present invention which embodies the present invention.

The retainer 18 is of generally cylindrical construction and is dimensioned to be received within the counterbore 73. The rear end 80 of the retainer is in abutment against the forwardly facing shoulder 74 of counterbore 73 and includes at its forward end a plurality of axial slots which form forwardly extending fingers 81 which are bent towards the axis of the retainer and communicate with the rearwardly facing shoulder 53 of flange 52 of the terminating pin assembly 17. The retainer 18 is shown in greater detail in FIG. 2. As can be seen in FIG. 2, the retainer includes the rearward portion 80 and the axial slots 82 with the bent finger portions 81 which depend towards the axis of the retainer in the forward direction. At the rearward end of the retainer, the retainer also includes a plurality of slotted portions 83 which are axially and angularly spaced. In this preferred embodiment, the slots are angularly spaced by approximately 90°. As can be seen, the slots extend into the retainer substantially normal to the axis of the retainer and thereby form at the rearward end of the retainer an integral spring means.

Referring again to FIG. 1, it can be seen that with the retainer coaxially disposed about the terminating pin assembly 17 and communicating at its rearward end with the forwardly facing shoulder 74 of counterbore 73 and communicating with the rearwardly facing shoulder 53 of flange 52 of the terminating pin assembly 17, the retainer retains the terminating pin assembly against rearward movement. Also, the integral spring means formed by the slots 83 causes the retainer to freely urge the pin assembly 17 in the forwaard direction so that the terminal end face 57 is in continuous abutment with a spacer 90 carried by the mating receptacle connector.

As can be seen from FIG. 1, the retainer provides the resilient urging of the pin assembly in the forward direction without blocking the gap between the terminating pin and the inner surface of the channel formed by the bores 72 and 73. As a result, it is a simple matter to extract the cable and terminating pin assembly by simply introducing an appropriate tool which causes the tines or fingers 81 to be displaced for releasing the flange 52. Thereafter, the pin assembly can be easily removed. As a result, the receptacle connector 11 is readily field serviceable. Inasmuch as there are no alignment components blocking access of the pin removal tool to the pin retaining mechanisms, damage to any of the component parts of the connector during removal of the pin assembly upon servicing is substantially precluded.

Referring now to the receptacle connector 12 of FIG. 1, the terminating pin assembly 24 is formed in the shape of a hollow cylindrical pin and includes a forwardly extending minor diameter portion 100 and a rearward major diameter portion 101. The major diameter portion 101 includes a circumferential flange 102 which has a rearwardly facing shoulder portion 103. The rear rigid body portion 23 includes a bore 105 having depending fingers or tines 106 which communicate with the rearwardly facing shoulder portion 103 of flange 102 for retaining the pin assembly 24 within the connector.

Figure 3:
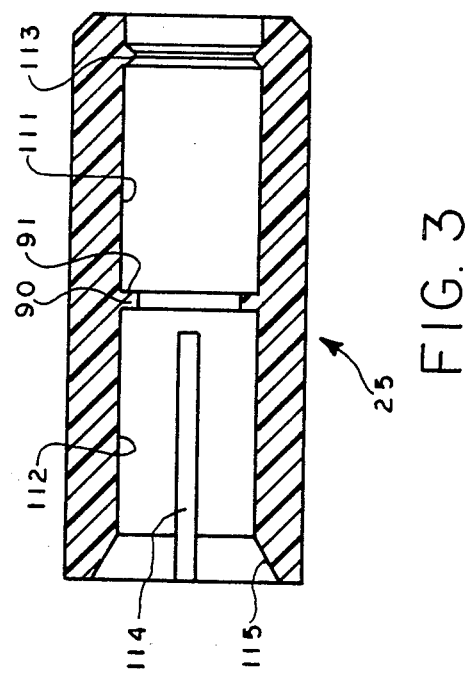
FIG. 3 is a cross-sectional view of another principal component of the fiber optic connector of the present invention which embodies the present invention.

The forward rigid body portion 22 includes a bore 110 which is dimensioned for receiving the alignment sleeve 25. The alignment sleeve 25 is shown in greater detail in FIG. 3. The alignment sleeve 25 is generally cylindrical in shape and is formed from a resilient material such as Teflon or a suitable plastic. It includes a rear bore 111 and a forward bore 112 which are separated by the peripheral inner flange 90 which forms a spacer or stop means between the bores. The rear bore 111 includes an inner circumferential V-shaped ridge 113 which coacts with a V-shaped circumferential notch 107 of the forward pin extension 100 for captivating the forward extension 100 within the rear bore 111. The flange 90 and the ridge 113 are so spaced apart that when the pin extension 100 is received within the bore 111 so that the notch 107 receives the ridge 113, the forward terminal end face 108 of the pin assembly 24 is in abutment with the rearwardly facing shoulder portion 91 of flange 90.

At its forward end, the alignment sleeve 25 includes a plurality of axial slots 114 and a conical opening 115. The conical opening 115 guides the mating forward end 50 of pin assembly 17 into the forward bore 112 and the slots 114 provide resilient surface contact between the bore and the pin to further secure the pin within the bore.

The terminal pin assembly 24 includes along its entire length a longitudinal bore which is dimensioned for receiving the fiber optic cable which it terminates (not shown). Its cable also includes one or more optical fibers which are epoxied at the forward end of the pin assembly and ground and polished to a smooth surface at the terminal end face 108. Thus, when the plug and receptacle connectors are joined in the fully mated relation as shown in FIG. 1, the terminal end faces of the pins and thus the optical fibers will be closely and accurately spaced apart by the width dimension of the flange 90 to achieve efficient light transfer. Also, the bores 111 and 112 are dimensioned for tightly receiving the forward ends of the pin assemblies and are aligned relative to one another so that the terminal ends of the pin assemblies will also be in aligned relation for effecting efficient light transfer.

The plug and receptacle connectors comprising the fiber optic connector assembly of the present invention enables accurate alignment and close spacing of the forward ends of the optical fibers which are optically coupled together to achieve efficient light transfer while at the same time minimizing the number of component parts which must be manufactured to a tight tolerance. Because the retainer 18 includes the integral spring means for urging the pin assembly 17 in the forward direction so that its terminal end face 57 is in abutment with flange 90 of alignment sleeve 25, axial manufacturing tolerances are absorbed. Also, the alignment sleeve 25 may be so dimensioned as to float within the bore 110 of rigid body portion 22 so that neither the bore 110 nor the outer dimension of sleeve 25 is critical. The critical dimensions which must be tightly controlled are only the dimensions of the bores 111 and 112 of the alignment sleeve, which is a plastic or Teflon part, and thus easily manufacturable. Even these dimensions are not extremely critical inasmuch as the alignment sleeve is constructed from a resilient material.

As previously mentioned, the connector assembly of the present invention is readily field serviceable inasmuch as there is no alignment structure blocking access of a removal tool to the retaining fingers 81 which retain the pin assembly 17. Similarly, there are no alignment components which block access of the removal tool to the tines 106 which retain the pin assembly 24. As a result, the fiber optic connector assembly of the present invention may be readily field serviceable without consequent damage to its individual component parts.

While a particular embodiment of the invention has been shown and described, modifications may be made, and it is intended in the appended claims to cover all such changes and modifications which fall within the true spirit of the invention.

We claim:

1. A fiber optic connector assembly comprising:
   a pair of fiber optic connector members for optically coupling forward ends of optical fibers of a pair of fiber optic cables;
   said pair of fiber optic connector members including at least one connector member having a rigid terminating member, a channel, and retainer means;
   a resilient sleeve for aligning and closely spacing said forward ends of said optical fibers of said pair of fiber optic cables, said resilient sleeve floating within said channel of at least one connector member;
   said terminating member having a longitudinal bore dimensioned for receiving said forward end of said optical fiber of one of said fiber optic cables and having and outer engageable portion;
   said channel having an inner surface dimensioned for receiving said terminating member and having an inner engageable portion; and
   said retainer means being disposed between said channel inner surface and said terminating member to retain said terminating member within said channel against rearward movement, said retainer means comprising a unitary member including a forward end portion having means for engaging said terminating member outer engageable portion and a rearward end portion engaging said channel inner engageable portion, said retainer means having integral resilient means freely urging said terminating member forward into said resilient sleeve;
   whereby said pair of fiber optic connector members can optically couple said forward ends of said optical fibers of said pair of fiber optic cables in aligned and closely spaced relationship for efficient light transfer.

2. A fiber optic connector assembly as defined in claim 1 wherein said means for engaging said terminating member outer engageable portion includes a plurality of tines.

3. A fiber optic connector assembly as defined in claim 2 wherein said tines are defined by a plurality of axial grooves in said forward end portion, said retainer means comprises a hollow cylindrical member, and said tines converge towards the longitudinal axis of said cylindrical member for engagement with said terminating member outer engageable portion.

4. A fiber optic connector assembly as defined in claim 3 wherein said cylindrical member includes a plurality of slots in said rearward end portion, said slots lying in planes perpendicular to said longitudinal axis of said cylindrical member and being angularly and axially spaced to define said integral resilient means.

5. A fiber optic connector assembly as defined in claim 4 wherein said channel includes a counterbore defining a forwardly facing shoulder, said forwardly facing shoulder comprises said inner engageable portion and said cylindrical member is slidably received within said counterbore, and wherein said rearward end portion of said cylindrical member engages said forwardly facing shoulder.

6. A fiber optic connector assembly as defined in claim 4 wherein said slots are angularly and alternately spaced by substantially 90°.

7. A fiber optic connector assembly as defined in claim 4 wherein said terminating member comprises a cylindrical pin member having a circumferential flange, said circumferential flange defining a rearwardly facing shoulder comprising said outer engageable portion.

8. A fiber optic connector assembly as defined in claim 1 wherein at least one of said fiber optic cables includes strength members coaxially disposed about said optical fiber.

9. A fiber optic connector assembly as defined in claim 8 wherein said terminating member comprises a generally cylindrical pin having a rear end and a plurality of axial slots in said rear end terminating in a forward curved portion.

10. A fiber optic connector assembly as defined in claim 9 wherein said forward curved portion in said generally cylindrical pin is adapted for receiving said cable strength members, said assembly also including a ring-shaped retaining member adapted to securely fit within said forward curved portion for securing said cable strength members.

11. A fiber optic connector assembly as defined in claim 10 wherein said ring-shaped retaining member comprises a split ring ferrule.

12. A fiber optic connector assembly comprising:
a pair of fiber optic connector members for optically coupling forward ends of optical fibers of a pair of fiber optic cables;
said pair of fiber optic connector members each including a rigid terminating member, a channel and retainer means;
said terminating members each having a longitudinal bore dimensioned for receiving said forward end of said optical fiber of one of said fiber optic cables and having an outer engageable portion;
a floating resilient sleeve located within at least one of said pair of fiber optic connector members for receiving both of said terminating members to align and closely space said forward ends of said optical fibers of said pair of fiber optic cables;
said channels each having an inner surface dimensioned for receiving one of said terminating members and having an inner engageable portion; and
said retainer means each being disposed between the corresponding ones of said channel inner surfaces and said terminating members to retain said terminating members within said channels against rearward movement, at least one of said retainer means comprising a unitary member including a forward end portion having means for engaging the corresponding one of said terminating member outer engageable portions and a rearward end portion engaging the corresponding one of said channel inner engageable portions, said one retainer means having integral resilient means and cooperating with the other of said retainer means to cause said terminating members to be freely urged forward into said resilient sleeve;
whereby said pair of fiber optic connector members can optically couple said forward ends of said optical fibers of said pair of fiber optic cables in aligned and closely spaced relationship for efficient light transfer.

13. A fiber optic connector assembly as defined in claim 12 wherein said resilient sleeve floats within said channel of at least one of said fiber optic connector members.

14. A fiber optic connector assembly as defined in claim 12 wherein said resilient sleeve includes abutment means against which said terminating members are urged.

15. A fiber optic connector assembly as defined in claim 14 wherein said terminating members of said fiber optic connector members include front ends urged against said abutment means of said resilient sleeve for accurately and closely spacing said forward ends of said optical fibers of said fiber optic cables.

16. A fiber optic connector assembly as defined in claim 14 wherein said abutment means comprises an inner circumferential flange within said resilient sleeve.

17. A fiber optic connector assembly as defined in claim 12 wherein said resilient sleeve includes an inner locking protrusion.

18. A fiber optic connector assembly as defined in claim 17 wherein one of said terminating members includes an outer surface indentation for locking engagement with said inner locking protrusion of said resilient sleeve.

19. A fiber optic connector assembly as defined in claim 18 wherein said inner locking protrusion comprises a circumferential V-shaped ridge within said resilient sleeve and said terminating member outer surface indentation comprises a complementary circumferential V-shaped notch.

20. A fiber optic connector assembly as defined in claim 12 wherein said channel comprises a generally cylindrical inner surface, said resilient sleeve comprises a generally cylindrical tube, and said terminating member comprises a generally cylindrical pin member.

21. A fiber optic connector assembly as defined in claim 20 wherein said resilient sleeve includes at least one forward axial slot to cause said sleeve to resiliently expand about and hold said pin member.

22. A fiber optic connector assembly as defined in claim 21 wherein the forward entrance to said resilient sleeve comprises a conical surface having sidewalls converging inwardly for directing said pin member into said resilient sleeve.

23. In a fiber optic connector assembly of the type including a pair of fiber optic connector members for optically coupling forward ends of optical fibers of a pair of fiber optic cables where said fiber optic connector members each have means for terminating said forward end of said optical fiber of one of said pair of fiber optic cables, the improvement comprising:

a floating resilient sleeve for receiving said terminating means to align and closely space said forward ends of said optical fibers of said pair of fiber optic cables; and means for retaining said terminating means within said fiber optic connector members against rearward movement, said retaining means freely urging said terminating means forward into said floating resilient sleeve.

24. A fiber optic connector assembly as defined in claim 23 wherein said retaining means includes a separate retainer associated with each of said fiber optic connector members.

25. A fiber optic connector assembly as defined in claim 24 wherein at least one of said retaining means comprises a unitary member.

26. A fiber optic connector assembly as defined in claim 25 wherein said unitary member includes a forward end portion having means cooperatively engaging the corresponding one of said terminating means and a rearward end portion having integral resilient means cooperatively engaging the corresponding one of said fiber optic connector members.

27. A fiber optic connector assembly as defined in claim 23 wherein said resilient sleeve floats within at least one of said fiber optic connector members.

28. A fiber optic connector assembly as defined in claim 23 wherein said resilient sleeve includes abutment means against which said terminating means are urged.

29. A fiber optic connector assembly as defined in claim 28 wherein said terminating means are pin members having front ends urged against said abutment means of said resilient sleeve.

30. A retainer member for retaining a terminating member within a fiber optic connector against rearward movement and urging said terminating member forward within said fiber optic connector comprising a forward end portion having a plurality of tines cooperatively engaging said terminating member and a rearward end portion having integral resilient means rearward of said tines cooperatively engaging said fiber optic connector.

31. A retainer member as defined in claim 30 wherein said tines are defined by a plurality of axial grooves in said forward end portion, said forward and rearward end portions together defining a hollow generally cylindrical member, said tines converging towards the longitudinal axis of said cylindrical member for engagement with said terminating member.

32. A retainer member as defined in claim 30 wherein said rearward end portion includes a plurality of slots, said slots lying in planes perpendicular to said terminating member and being angularly and axially spaced to define said integral resilient means.

33. A retainer member as defined in claim 32 wherein said slots are angularly and alternately spaced by substantially 90°.

34. A fiber optic connector assembly comprising: a pair of fiber optic connector members for optically coupling forward ends of optical fibers of a pair of fiber optic cables;

a resilient sleeve for aligning and closely spacing said forward ends of said optical fibers of said pair of fiber optic cables;

said pair of fiber optic connector members including at least one connector member having a rigid terminating member, a channel, and retainer means;

said terminating member having a longitudinal bore dimensioned for receiving said forward end of said optical fiber of one of said fiber optic cables and having an outer engageable portion;

said channel having an inner surface dimensioned for receiving said terminating member in floating relationship and having an inner engageable portion; and said retainer means being disposed between said channel inner surface and said terminating member to retain said terminating member within said channel against rearward movement, said retainer means comprising a unitary member including a forward end portion having means for engaging said terminating member outer engageable portion and a rearward end portion engaging said channel inner engageable portion, said retainer means having integral resilient means freely urging said terminating member forward into said resilient sleeve;

whereby said pair of fiber optic connector members can optically couple said forward ends of said optical fibers of said pair of fiber optic cables in aligned and closely spaced relationship for efficient light transfer.

35. A fiber optic connector assembly as defined in claim 34 wherein said resilient sleeve floats within said channel of at least one of said connector members.

36. In a fiber optic connector assembly of the type including a pair of fiber optic connector members for optically coupling forward ends of optical fibers of a pair of fiber optic cables where said fiber optic connector members each have means for terminating said forward end of said optical fiber of one of said pair of fiber optic cables, the improvement comprising:

a resilient sleeve for receiving said terminating means to align and closely space said forward ends of said optical fibers of said pair of fiber optic cables; and means for retaining said terminating means within said fiber optic connector members against rearward movement, said retaining means freely urging said terminating means forward into said resilient sleeve, said terminating means floating within said fiber optic connector members.

37. A fiber optic connector assembly as defined in claim 36 wherein said resilient sleeve floats within at least one of said fiber optic connector members.

38. A fiber optic connector assembly comprising:

a pair of fiber optic connector members for optically coupling forward ends of optical fibers of a pair of fiber optic cables;

said fiber optic connector members each having a floating terminating pin receiving said forward end of said optical fiber of one of said pair of fiber optic cables, said pair of fiber optic connector members including at least one connector member having a channel; and a resilient sleeve for aligning and closely spacing said forward ends of said optical fibers of said pair of fiber optic cables, said resilient sleeve including a hollow elongated portion for receiving said terminating pins in opposite ends thereof and abutment means against which said terminating pins rest, said hollow elongated portion being dimensioned and shaped to float within said at least one connector member.

39. A fiber optic connector assembly as defined in claim 38 wherein said abutment means includes a flange on the inner surface of said hollow elongated portion.

40. A fiber optic connector assembly as defined in claim 38 wherein said hollow elongated portion includes at least one axial slot to cause said sleeve to resiliently expand about and hold said terminating pins.

41. A fiber optic connector assembly as defined in claim 40 wherein said hollow elongated portion includes a forward entrance having a conical surface with sidewalls converging inwardly for directing said terminating pins thereinto.

* * * * *